United States Patent Office 3,540,235
Patented Nov. 17, 1970

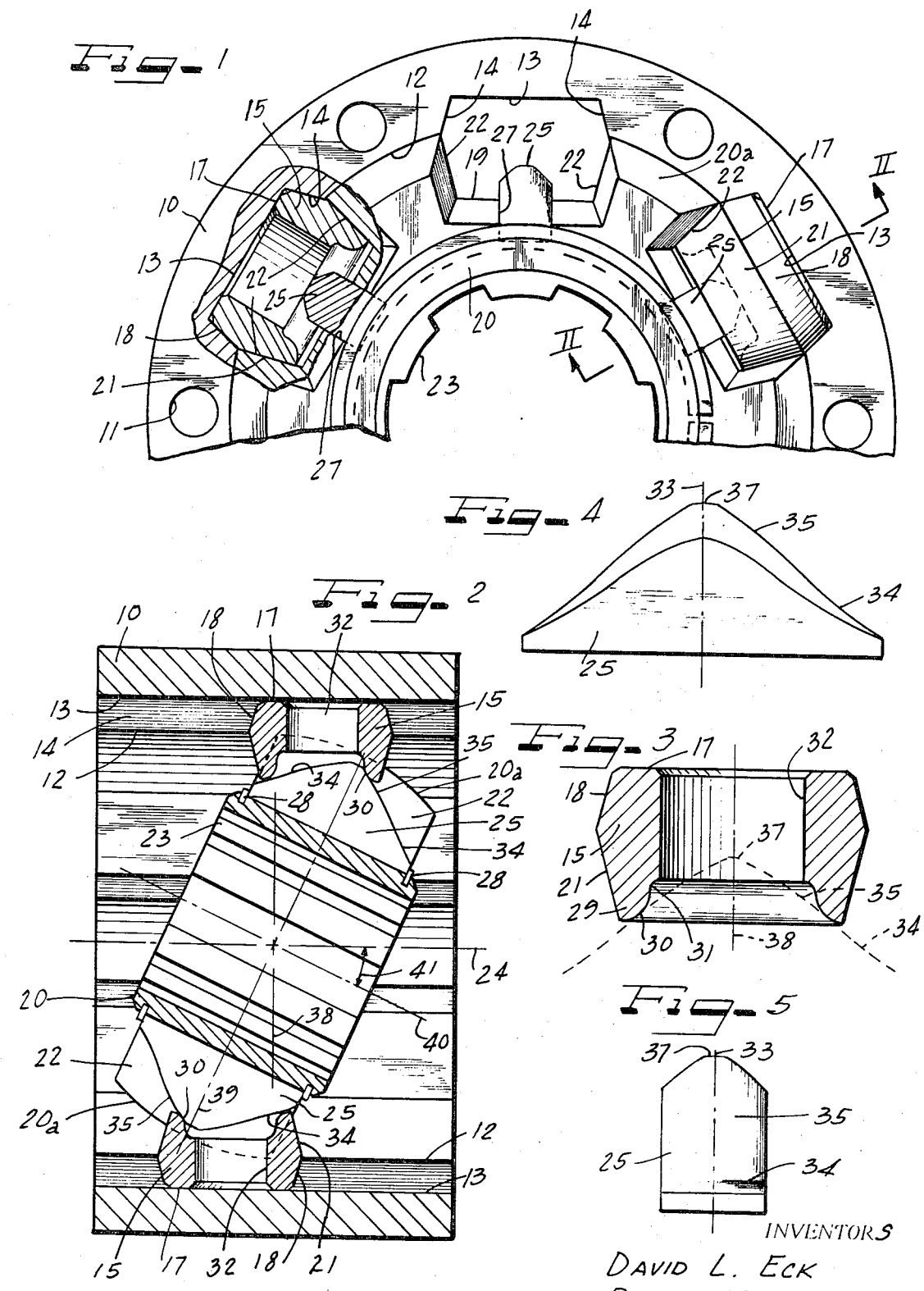

3,540,235
WIDE ANGLE CONSTANT VELOCITY
UNIVERSAL JOINT
David L. Eck and Philip T. Gibson, Columbus, Ohio,
assignors to Houdaille Industries, Inc., Buffalo, N.Y.,
a corporation of Delaware
Filed Jan. 28, 1969, Ser. No. 794,609
Int. Cl. F16d 3/30
U.S. Cl. 64—21                                    10 Claims

ABSTRACT OF THE DISCLOSURE

A universal joint includes relatively rockably movable race members having radially aligned axially extending circumferentially spaced confronting grooves within which are mounted torque-transmitting rollers each of which has a skirt with an annular bearing surface curved generally oppositely to and engaged by a cam fixed on the inner race and contoured to enable at least 25° angular shaft displacement.

This invention relates to wide angle constant velocity universal joints and is more particularly an improvement upon the uiversal joint covered in the patent of A. H. Rzeppa, No. 3,187,520, issued June 8, 1965, disclosure of which to the extent warranted is included herein by reference.

In the aforesaid patent the disclosed universal joint operates with excellent results through angles up to 11.5°. Some applications for this type of joint, however, require a wider misalignment operating shaft angle, and it is to the attainment of that end that we have discovered certain critical modifications in the torque-transmitting rollers and cams of this type of joint which will attain greatly increased shaft misalignment capabilities.

In accordance with the principles of the invention, we provide novel coactive surface configurations on the rollers and the cams in the joint which will attain up to 25h shaft angularity as well as other advantages.

An important object of the present invention is to provide a novel wide angle constant velocity universal joint construction.

Another object of the invention is to provide new contouring in the coactive surfaces of the rollers and the cams in a universal joint of the character indicated to attain unusually wide shaft angles.

Another object of the invention is to provide a novel relationship of the contact surfaces on the rollers and cams in a universal joint construction of the character indicated which will reduce contact stresses, improve cam wear and improve consistency of angular velocity.

Still another object of the invention is to provide a universal joint of the character indicated having a novel construction affording improved load sharing among the rollers in the joint and increase in torque capacity of the joint.

Other objects, features and advantages of the present invention will be readily apparent from the following detailed description of a preferred embodiment thereof taken in conjunction with the accompanying drawings, in which:

FIG. 1 is a fragmentary, partially sectional, elevational view of a universal joint embodying principles of the invention;

FIG. 2 is a sectional view taken substantially along the line II—II of FIG. 1 but showing the races of the joint in one maximum angular shaft position;

FIG. 3 is an enlarged axial sectional view through one of the rollers;

FIG. 4 is a side elevational view of one of the cams; and

FIG. 5 is an end elevational view of the cam.

A constant velocity universal joint embodying principles of the invention comprises an outer race 10 having suitable means such as bolt holes 11 receptive of bolts for attaching the race to the driving flange (not shown) of a shaft assembly. At equally spaced circumferential intervals in an inner cylindrical surface 12, the outer race has axially extending respective grooves 13 each provided with a flat root wall and radially inwardly diverging flat or slightly curved side walls 14 and within which grooves are mounted respective torque-transmitting rollers 15. Each of the rollers 15 has a flat outer end or backface 17 which slidably engages the root surface of the groove within which mounted, while an annular outer perimeter surface 18 of slightly crowned, generally frusto-conical taper confronts the groove surfaces 14 in generally complementary relation and with the groove walls being on a slight oversize differential width relative to the roller surface 18 so that the roller in each instance may turn on either groove side without rubbing on the other side.

From its groove 13 in the outer race 10, each of the rollers 15 projects to a suitable extent, and desirably more than half its length into a complementary groove 19 in an inner race 20 and extending axially and opening radially outwardly through a outer perimeter spherically curved surface 20a which has slidable contact with the outer race surface 12 enabling angular and axial relative movements of the races. Torque thrust engagement of the rollers 15 with the inner race 20 within the respective grooves 19 is through respective annular radially inwardly tapering generally frusto-conical and slightly crowned perimeter surfaces 21 on the rollers confronting generally complementary radially outwardly flaring side walls 22 which are curved in the axial direction and are on a slightly oversize differential width relative to the roller surface 21 to enable thrusting rolling contact of the roller with one side while turning freely out of contact with the opposite side in operation. Means such as splines 23 on the inner perimeter of the race 20 enable corotational attachment of a shaft section to be driven through the joint by the driving shaft section attached to the outer race 10.

Coupling of the rollers 15 to the inner race 20 in a manner to enable angular displacement of the shaft sections as reflected in similar angular displacements from a coaxial relation along a central axis 24 of the race 10 (FIG. 2) is effected by means of respective cams 25 fixedly carried by the inner race 20 and which may be formed integral with the inner race but for practical manufacturing reasons are desirably separately formed as bars of generally isosceles triangular shape in side elevation and with a straight edge bottom portion mounted in a respective axially extending groove 27 provided in the bottom of each of the grooves 19 centrally between the side walls 22. Locking of the cams 25 against axial displacement relative to the inner race is by means comprising snap-in retaining rings 28 or other mechanical stops.

In order to attain shaft misalignment angles up to 25°, the rollers 15 and the cams 25 are provided with novel interlockingly coactive contoured surfaces which engage in all rocking relationships of the races. To this end, each of the rollers 15 has an inner end annular terminal skirt portion 29 formed with an inner annular bearing surface 30 transversely convexly curvate from junction with the thrust surface 21 and then radially and axially inwardly on a substantial radius of curvature to a reversely, concave annular fillet surface 31 which terminates at the end of an axial bore 32 of substantial diameter through the roller. Thereby, the inner annular surface of the skirt is of a generally ogee curvature. By way of example, in a universal joint for three inch shaft, and in which the assembly utilizes six of the rollers in diametrically opposite paired relationship in the joint, the rollers may have a diameter at juncture of the surfaces 18 and 21 of about 2.329 inches, a length of about 1.265 inches, a diameter of about 1.25 inches in the bore 32 and with the ogee skirt surface having a radius of curvature of about .250 inch in the bearing surface portion 30 and .125 inch in the surface portion 31. The taper angle of the surfaces 18 and 21 may be about 15°.

In this example, each of the cams 25 is formed as a symmetrically slabbed-off specially contoured cone of about 3.1 inches in length at the base, about .9180 inch in thickness and about 1.254 inches in height on a vertical axis 33 (FIGS. 4 and 5). All horizontal sections of the cam are circular as generated by turning the cam about its axis 33, and to provide sloping bearing surfaces to duplicate the exact motion of the contact point on the associated roller skirt. To this end the bearing surfaces are of a slightly ogee curvature, each having a slightly concave bearing surface portion or area 34 extending from the respective opposite ends of the cam to a slightly convex bearing surface portion or area 35 merging into a summit 37 of convex curvature. The relationship of the bearing surface areas 34 and 35 of the cam is such, with respect to each other and to the bearing surface 30 of the associated roller 15, as to make contact with the bearing surface 30 adjacent to juncture of the surface areas 34 and 35, in the coaxial relation of the outer and inner races 10 and 20 indicated by transverse coincident axis line 38 in FIG. 2 and as pictorially illustrated in dash outline in FIG. 3. In angular movements of the races 10 and 20, as exemplified in FIG. 2, so that they move out of a coincident plane of rotation on the transverse axis 38, the rollers 15 assume a plane of rotation which bisects the angle between the plane of rotation represented by the axis line 38 and on which the outer race 10 continues to rotate and an angular plane of rotation of the inner race represented by an axis line 39. In such angular orientation, the cam bearing surface areas 35 ride along the roller bearing surfaces 30 at the respective opposite sides of the relatively offset diametrically opposite rollers 15. At the same time, the concave bearing surface areas 34 at the opposite slopes of the cams have a small clearance with respect to the roller bearing surfaces 30 whereby to limit the bearing engagement to a single point engagement with the associated roller and facilitate rolling action of the rollers. Relative angular displacement of rotational axis 24 of the outer race 10 and rotary axis 40 of the inner race 20 is thus enabled to take place to an angle 41 of 25°. Throughout the range of relative movement of the rollers 15 and the associated cams 25, the clearance afforded by the fillet 31 and the bore 32 accommodates the summit 37.

As a result of the novel construction and bearing relationship of the rollers 15 and the cams 25, as compared with the specific arrangement in the aforesaid Pat. No. 3,187,520, not only is the permissible shaft angularity greatly increased to up to 25°, but the substantially enlarged central bore 32 enables roller deflection under operating loads to improve the load sharing among the rollers in the joint. The bore 32 is sized to permit adequate roller deflection while maintaining acceptable stress levels. The resulting improved load sharing among the rollers increases the torque capacity of the joint. The radius of curvature of the bearing surfaces 30 of the rollers keeps the cam-roller contact stress within acceptable limits and also increases the torque capacity of the joint and reduces the wear of cams and rollers. The cam contours affords several advantages among which may be mentioned better positioning of the rollers in the joint, increased angular misalignment or angular shaft deflection capacity of the joint, permits use of larger radius on the roller skirt bearing surface 30 for reduced contact stress, reduces cam wear, and improves consistency of angular velocity.

It will be understood that modifications and variations may be effected without departing from the scope of the novel concepts of the present invention.

We claim as our invention:

1. A universal joint including relatively rockably movable concentrically related race members having confronting bearing surfaces with respective circumferentially spaced and axially extending radially aligned confronting grooves within which are engaged torque-transmitting respective rollers with cams fixedly carried by the inner race member and interlockingly engaging the respective rollers in bearing relation:

each of said rollers having a skirt portion with an annular convex bearing surface confronting the associated cam; and each of said cams having contoured bearing surfaces engaging said annular bearing surface.

2. A joint according to claim 1, in which said bearing surfaces of the cams are of generally conical shape from a summit toward a base, and contact with the bearing surfaces of the rollers is along the sloping bearing surfaces in all relative positions of the cams and rollers.

3. A joint according to claim 2, in which said sloping bearing surfaces of the cams are of generally ogee configuration lengthwise therealong with concave areas near the base portions of the slopes and with convex areas near the summit portions of the slopes.

4. A joint according to claim 1, in which said cams are of generally isosceles triangular shape in side elevation having said bearing surfaces on edges contoured in slope from a summit toward opposite ends of a base to duplicate the exact motion of the respective contact points on the associated rollers, and with the bearing surfaces circular in horizontal section as related to an axis through said summit and said base.

5. A joint according to claim 4, in which said bearing surface contours are of ogee curvature along their length with a respective concave area near said base and a convex area near said summit and cooperating with said roller bearing surfaces to enable at least 25° angular shaft displacement.

6. A joint according to claim 5, said annular convex bearing surface of each of said rollers merges into a concave annular fillet providing clearance for said summit in maximum angular shaft displacement relationships of the cams and rollers.

7. A joint according to claim 4, in which said rollers have central openings which accommodate the summit portions of the associated cams freely.

8. A universal joint including relatively rockably movable concentrically related race members having confronting bearing surfaces with respective circumferentially spaced and axially extending radially aligned confronting grooves within which are engaged torque-transmitting respective rollers with cams fixedly carried by the inner race member and interlockingly engaging the respective rollers in bearing relation:

each of said cams being of bar form elongated in a longitudinal direction and having generally triangular outline in side elevation with contoured bearing surfaces along edges diverging from a summit; and each of said rollers having a skirt provided with an annular bearing surface of convex cross-section engageably confronting said cam bearing surfaces.

9. A joint according to claim 8, in which each of said rollers has a respective central bore opening, and a concave fillet surface joining said opening with said convex annular bearing surface.

10. A joint according to claim 9, in which said cam bearing surfaces are convexly curved transversely and of ogee curvature along their length and having respective convex portions near the summit and concave portions joining the ends of the convex portions remote from the summit, said annular bearing surfaces of the rollers engaging with said convex bearing surface portions in one relative operative position of the rollers and cams and engaging with respective concave portions of the cam bearing surfaces in other relative operative positions of the rollers and cams.

References Cited

UNITED STATES PATENTS

| | | | |
|---|---|---|---|
| 3,187,520 | 6/1965 | Rzeppa | 64—21 |
| Re. 26,691 | 10/1969 | Sharp | 64—21 |

JAMES A. WONG, Primary Examiner